US009719779B2

(12) United States Patent
Ishikawa et al.

(10) Patent No.: US 9,719,779 B2
(45) Date of Patent: Aug. 1, 2017

(54) FORM MEASURING MACHINE AND FORM MEASURING METHOD

(71) Applicant: MITUTOYO CORPORATION, Kawasaki-shi, Kanagawa (JP)

(72) Inventors: Nobuhiro Ishikawa, Ushiku (JP); Hideyuki Nakagawa, Tsukuba (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 158 days.

(21) Appl. No.: 14/929,588

(22) Filed: Nov. 2, 2015

(65) Prior Publication Data

US 2016/0131470 A1 May 12, 2016

(30) Foreign Application Priority Data

Nov. 6, 2014 (JP) .................................. 2014-226066

(51) Int. Cl.
*G01B 5/04* (2006.01)
*G01B 21/04* (2006.01)

(52) U.S. Cl.
CPC ................................. *G01B 21/045* (2013.01)

(58) Field of Classification Search
CPC .................................................... G01C 21/045
USPC ..................................................... 33/502, 503
See application file for complete search history.

(56) References Cited

U.S. PATENT DOCUMENTS

| 2012/0017453 A1* | 1/2012 | Ogihara | G01B 21/045 33/503 |
| 2014/0059872 A1* | 3/2014 | Nakagawa | G01B 21/045 33/502 |
| 2014/0130362 A1* | 5/2014 | Ishikawa | G01B 21/045 33/503 |
| 2015/0369655 A1* | 12/2015 | Ishikawa | G01H 11/08 73/579 |
| 2016/0018218 A1* | 1/2016 | Nakagawa | G01B 5/008 33/503 |
| 2016/0131470 A1* | 5/2016 | Ishikawa | G01B 21/045 33/503 |

FOREIGN PATENT DOCUMENTS

| JP | 2628523 | 7/1997 |
| JP | 2007-315897 | 12/2007 |
| JP | 2014-066693 | 4/2014 |
| JP | 2014-098610 | 5/2014 |

* cited by examiner

*Primary Examiner* — G. Bradley Bennett
(74) *Attorney, Agent, or Firm* — Rankin, Hill & Clark LLP

(57) ABSTRACT

A form measuring machine includes: a scanning probe including a stylus with a tip ball and a probe body attached with the stylus; a movable slider supporting the scanning probe; a scale detecting a slider displacement of the slider; a tip ball displacement detector detecting a tip ball displacement of the tip ball; and an arithmetic unit calculating a measurement value based on the slider displacement, the tip ball displacement and a correction filter and comprising a correction filter setting section that: calculates a correction matrix diagonal component from the slider displacement and the tip ball displacement detected by calibration of the scanning probe; and calculates a correction factor of the correction filter from the correction matrix diagonal component to set the correction filter.

7 Claims, 11 Drawing Sheets

FORM MEASURING MACHINE AND FORM MEASURING METHOD

The entire disclosure of Japanese Patent Application No. 2014-226066 filed Nov. 6, 2014 is expressly incorporated by reference herein.

TECHNICAL FIELD

The present invention relates to a form measuring machine, and a form measuring method for the form measuring machine.

BACKGROUND ART

A typical form measuring machine that measures a form of an object using a scanning probe has been known. When the form measuring machine performs, for instance, a circle measurement using the scanning probe, a motion error in the form of a projection (i.e., quadrant projection) is inevitable in switching quadrants in a machine rectangular coordinate system (i.e., inverting a motion direction in each axis), which results in a measurement error.

In view of the above, form measuring machines configured to correct a measurement error due to the quadrant projection are disclosed (see, for instance, Patent Literature 1: JP-A-2007-315897, Patent Literature 2: JP-A-2014-66693 and Patent Literature 3: JP-A-2014-98610).

The machine of Patent Literature 1 uses a correction filter designed in view of characteristics of frequency transfer from a scale to a slider tip to correct a measurement error due to the quadrant projection. In order to correct a measurement error due to the quadrant projection, the machine of Patent Literature 2 uses a correction filter designed in view of characteristics of frequency transfer from a scale to a probe tip ball, and the machine of Patent Literature 3 uses a correction filter designed in view of inverse characteristics of frequency transfer from a scale to a probe tip ball.

According to Patent Literatures 2 and 3, a correction factor suitable for the scanning probe is applied to the correction filter in advance to correct a measurement error due to the quadrant projection. However, when a stylus of the scanning probe is replaced, the correction filter cannot sufficiently exhibit a correction performance, which necessitates a troublesome work. For instance, an operator needs to input a correction factor suitable for the scanning probe attached with a new stylus so that the correction filter can sufficiently exhibit a correction performance.

SUMMARY OF THE INVENTION

An object of the invention is to provide a form measuring machine and a form measuring method that are capable of easy setting of a correction filter for correcting a measurement error and of highly accurate form measurement.

According to a first aspect of the invention, a form measuring machine includes: a scanning probe including: a stylus with a tip end provided with a tip ball that is brought into contact with an object to be measured; and a probe body attached with the stylus; a movable slider configured to support the scanning probe; a scale configured to detect a slider displacement of the slider; a tip ball displacement detector configured to detect a tip ball displacement of the tip ball of the scanning probe relative to a support portion where the slider supports the scanning probe; and an arithmetic unit configured to calculate a measurement value based on the slider displacement detected by the scale, the tip ball displacement detected by the tip ball displacement detector, and a correction filter configured to correct a measurement error, the arithmetic unit including a correction filter setting section configured to: calculate a correction matrix diagonal component from the slider displacement detected by the scale and the tip ball displacement detected by the tip ball displacement detector during measurement of a calibration reference piece; and calculate a correction factor of the correction filter from the correction matrix diagonal component to set the correction filter, the correction matrix associating the tip ball displacement with a coordinate system for the scale.

In the first aspect, the calibration reference piece is measured using the scanning probe with the stylus being attached to the probe body (a calibration step of the scanning probe). Based on a detection value (slider displacement) detected by the scale and a detection value (tip ball displacement) detected by the tip ball displacement detector in the calibration step, the correction filter setting section calculates the correction matrix diagonal component, and calculates a correction factor for correcting a measurement error due to a quadrant projection from the diagonal component to set the correction filter.

When the correction filter based on, for instance, the inverse characteristics of frequency transfer from the scale to the probe tip ball is used for measurement of an object, the set correction filter is applied to the detection value detected by the tip ball displacement detector to correct the detection value, and the corrected detection value is added to the detection value detected by the scale to obtain a measurement value. For instance, when the correction filter based on the characteristics of frequency transfer from the scale to the probe tip ball is used, the set correction filter is applied to the detection value detected by the scale to correct the detection value, and the corrected detection value is added to the detection value detected by the tip ball displacement detector to obtain a measurement value.

Thus, even when the stylus of the scanning probe is replaced, it is possible to easily set the correction filter with a correction factor conforming with conditions of the newly attached stylus (e.g., a length). In other words, form measurement can be performed with high accuracy using a correction factor suitable for the scanning probe attached with a new stylus after replacement without the necessity for an operator to input the suitable correction factor.

In the first aspect, it is preferable that the correction filter setting section calculates the correction factor of the correction filter using a factor calculation function or table data that shows a relationship between the correction matrix diagonal component for the scanning probe and the correction factor of the correction filter for the scanning probe.

In the first aspect, the correction filter setting section calculates a correction factor of the correction filter (i.e., a correction factor suitable for the scanning probe attached to the form measuring machine) based on the factor calculation function or the table data showing the relationship between the correction matrix diagonal component for the scanning probe and the correction factor for the scanning probe.

An appropriate correction factor suitable for the scanning probe can thus be easily calculated from the correction matrix diagonal component, which is obtained by calibrating the scanning probe, with reference to the factor calculation function irrespective of the type of the stylus attached to the probe body of the scanning probe. This results in an increase in the processing speed.

In the first aspect, it is preferable that the stylus includes plural types of styli attached in turn to the probe body to define a plurality of scanning probes including the scanning probe, the scanning probes being used in turn to measure the calibration reference piece to calculate individual values of the correction matrix diagonal component and corresponding individual values of the correction factor of the correction filter for the scanning probes, and the arithmetic unit further includes a function generating section configured to generate the factor calculation function or the table data based on the individual values of the correction matrix diagonal component and the corresponding individual values of the correction factor of the correction filter for the scanning probes.

In the first aspect, the function generating section generates the factor calculation function or the table data. Specifically, in the form measuring machine, plural types of styli are attached in turn to the probe body to define a plurality of scanning probes, and calibration of each of the scanning probes (measurement of the calibration reference piece) is performed. The function generating section then calculates a factor calculation function based on individual values of the correction matrix diagonal component for the scanning probes, which are obtained by the calibration, and corresponding individual values of the correction factor for the scanning probes. Alternatively, the function generating section generates table data where the individual values of the correction matrix diagonal component for the scanning probes are associated with the corresponding individual values of the correction factor for the scanning probes.

The optimum factor calculation function or the table data in terms of the current measurement conditions can thus be generated irrespective of any change in measurement conditions such as a change in a measurement environment and a change in the scanning probe with time. Consequently, the correction filter setting section can calculate the correction factor allowing for highly accurate form measurement with reference to the factor calculation function or the table data.

In the first aspect, it is preferable that the correction factor of the correction filter includes a zero-point angular frequency, a pole angular frequency, a zero-point damping factor and a pole damping factor, and the correction filter setting section calculates at least the zero-point angular frequency.

The correction filter may be calculated based on correction factors, namely, the zero-point angular frequency, the pole angular frequency, the zero-point damping factor and the pole damping factor, and the Laplace operator as described in, for instance, Patent Literature JP-A-2014-66693. It should be noted that the "zero point" means a value of the Laplace operator determined when the correction filter is zero, and the "pole" means a value of the Laplace operator determined when the correction filter is infinity. In the first aspect, the correction filter setting section calculates at least the zero-point angular frequency of the above correction factors. Since the zero-point angular frequency has a large influence on correction of a measurement error as compared with the other correction factors, the correction filter can be appropriately set by calculating at least the zero-point angular frequency.

According to a second aspect of the invention, a form measuring method for a form measuring machine, the form measuring machine including: a scanning probe including: a stylus with a tip end provided with a tip ball that is brought into contact with an object to be measured; and a probe body attached with the stylus; a movable slider configured to support the scanning probe; a scale configured to detect a slider displacement of the slider; and a tip ball displacement detector configured to detect a tip ball displacement of the tip ball of the scanning probe relative to a support portion where the slider supports the scanning probe, the method includes: calculating a correction matrix diagonal component from the slider displacement detected by the scale and the tip ball displacement detected by the tip ball displacement detector during measurement of a calibration reference piece, the correction matrix associating the tip ball displacement with a coordinate system for the scale; calculating a correction factor of the correction filter from the correction matrix diagonal component to set the correction filter; and calculating a measurement value based on the set correction filter, the slider displacement detected by the scale, and the tip ball displacement detected by the tip ball displacement detector.

In the second aspect, the correction factor of the correction filter is set based on the correction matrix diagonal component obtained by calibration of the scanning probe as in the first aspect. The correction filter can thus be easily appropriately set without the necessity for an operator to manually input the correction factor, for instance, each time when the stylus of the scanning probe is replaced. Further, since the correction filter is suitable for the newly attached stylus (scanning probe), the resulting calculated measurement value is highly accurate.

The above aspect(s) of the invention can provide a form measuring machine and a form measuring method that are capable of easily setting a correction filter suitable for a scanning probe and performing highly accurate form measurement using the correction filter.

BRIEF DESCRIPTION OF DRAWING(S)

Figure 6:
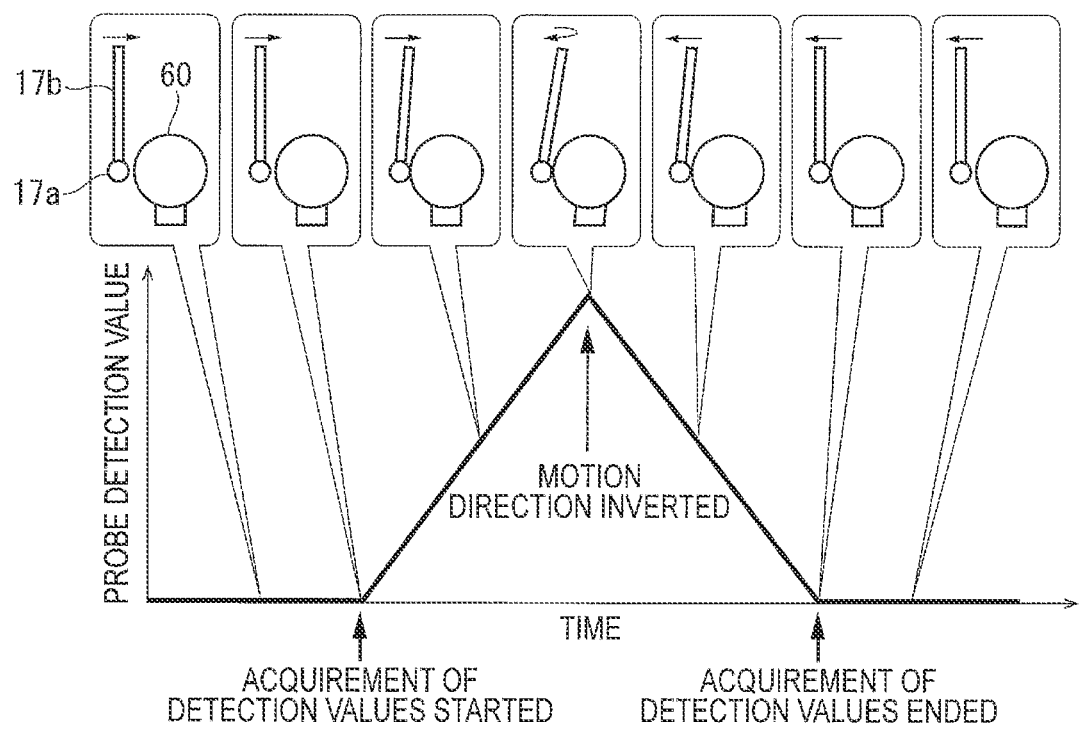

FIG. 6 schematically shows a single-point measurement process of the calculation method of the correction matrix diagonal component according to the exemplary embodiment.

Figure 7:
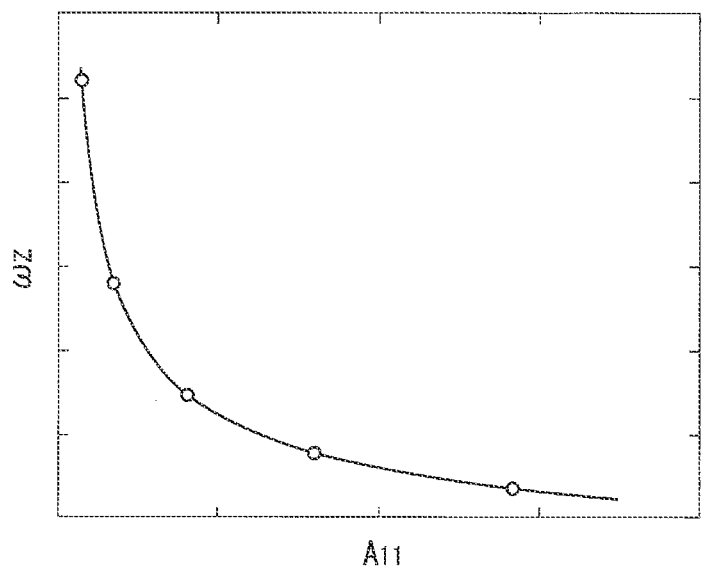

FIG. 7 shows the factor calculation function showing a relationship between the correction matrix diagonal component and a zero-point angular frequency according to the exemplary embodiment.

Figure 8:
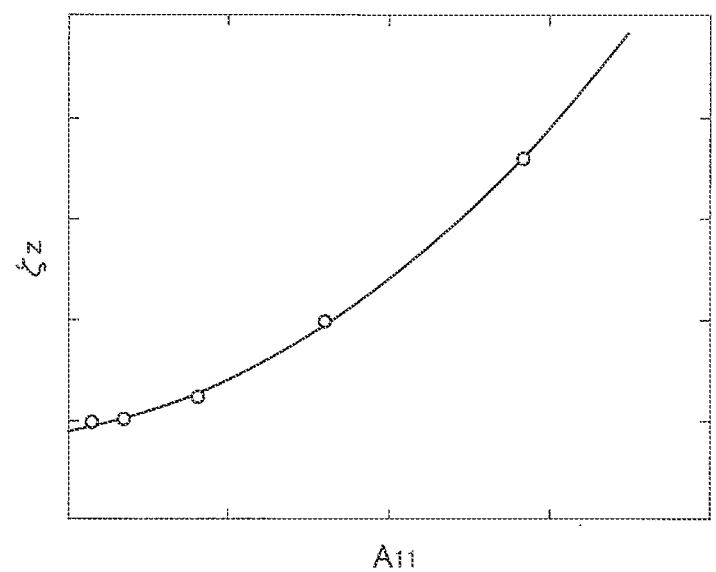

FIG. 8 shows the factor calculation function showing a relationship between the correction matrix diagonal component and a zero-point damping factor according to the exemplary embodiment.

Figure 9:
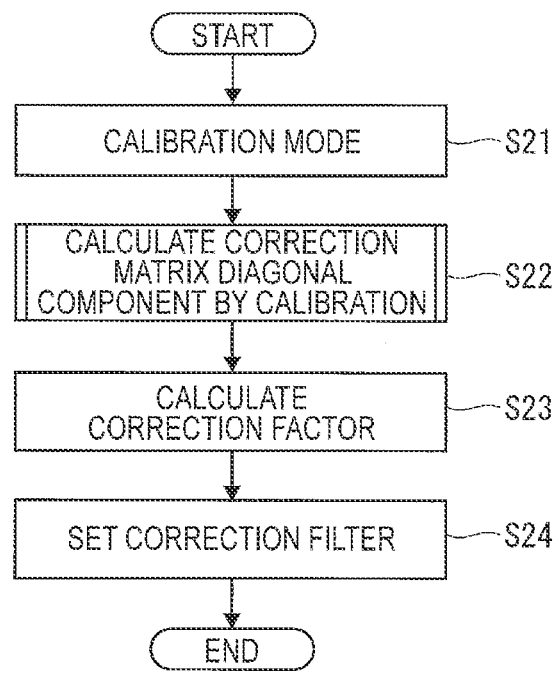

FIG. 9 is a flow chart showing a correction filter setting process according to the exemplary embodiment.

Figure 10:
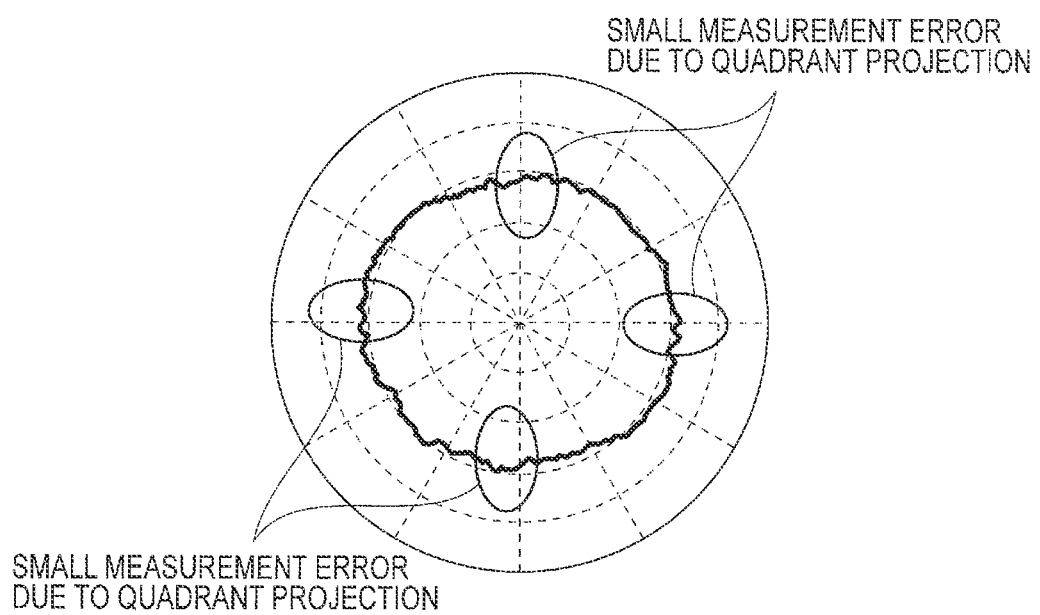

FIG. 10 shows an example of a measurement result of a ring gauge according to the exemplary embodiment.

Figure 11:
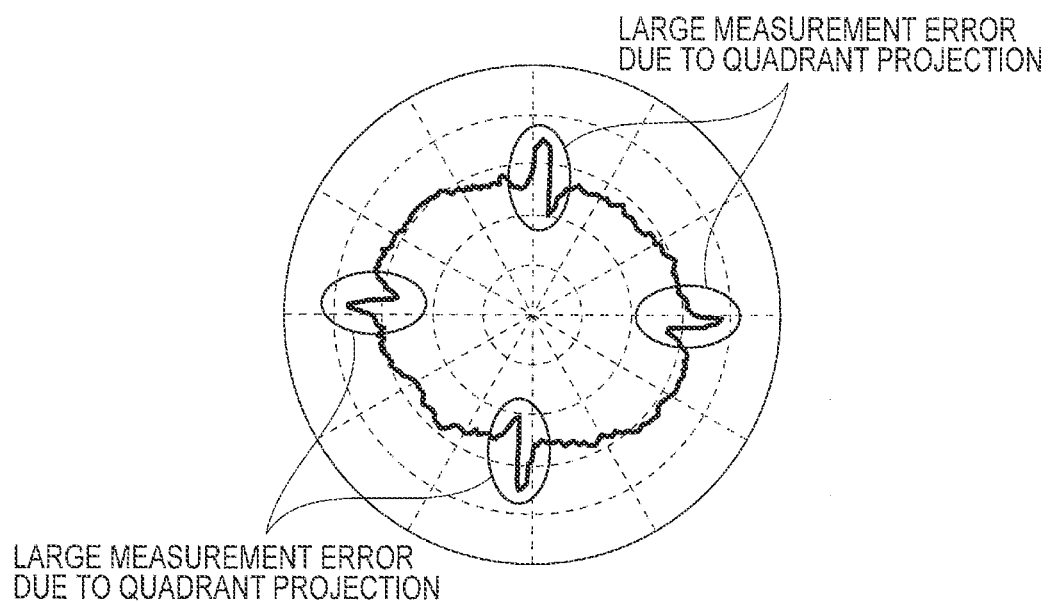

FIG. 11 shows an example of a measurement result of a ring gauge measured using a typical correction filter.

DESCRIPTION OF EMBODIMENT(S)

An exemplary embodiment of the invention will be described below with reference to the attached drawings.

Figure 1:
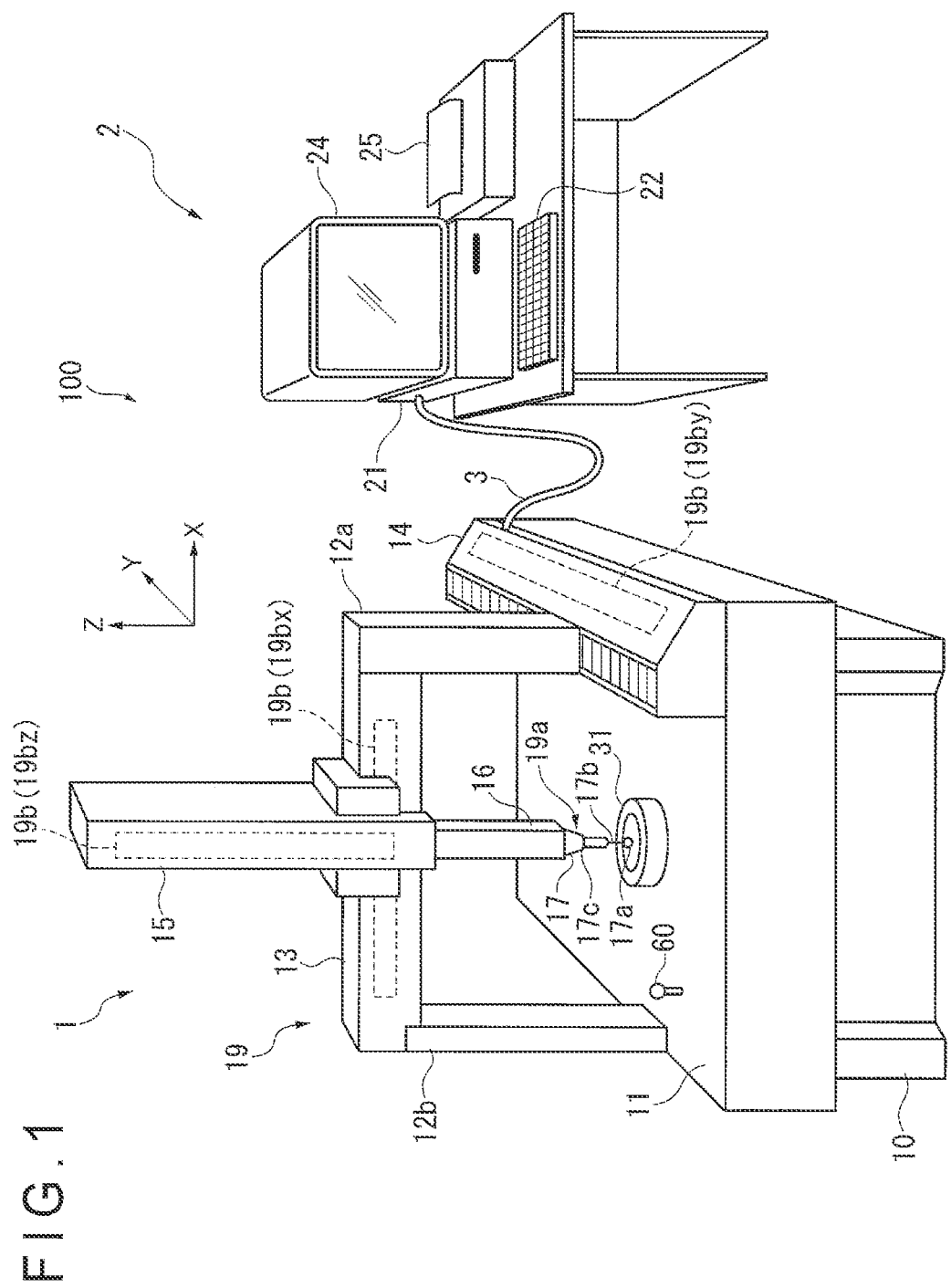
FIG. 1 is a perspective view schematically showing a form measuring machine according to an exemplary embodiment of the invention.
Figure 2:
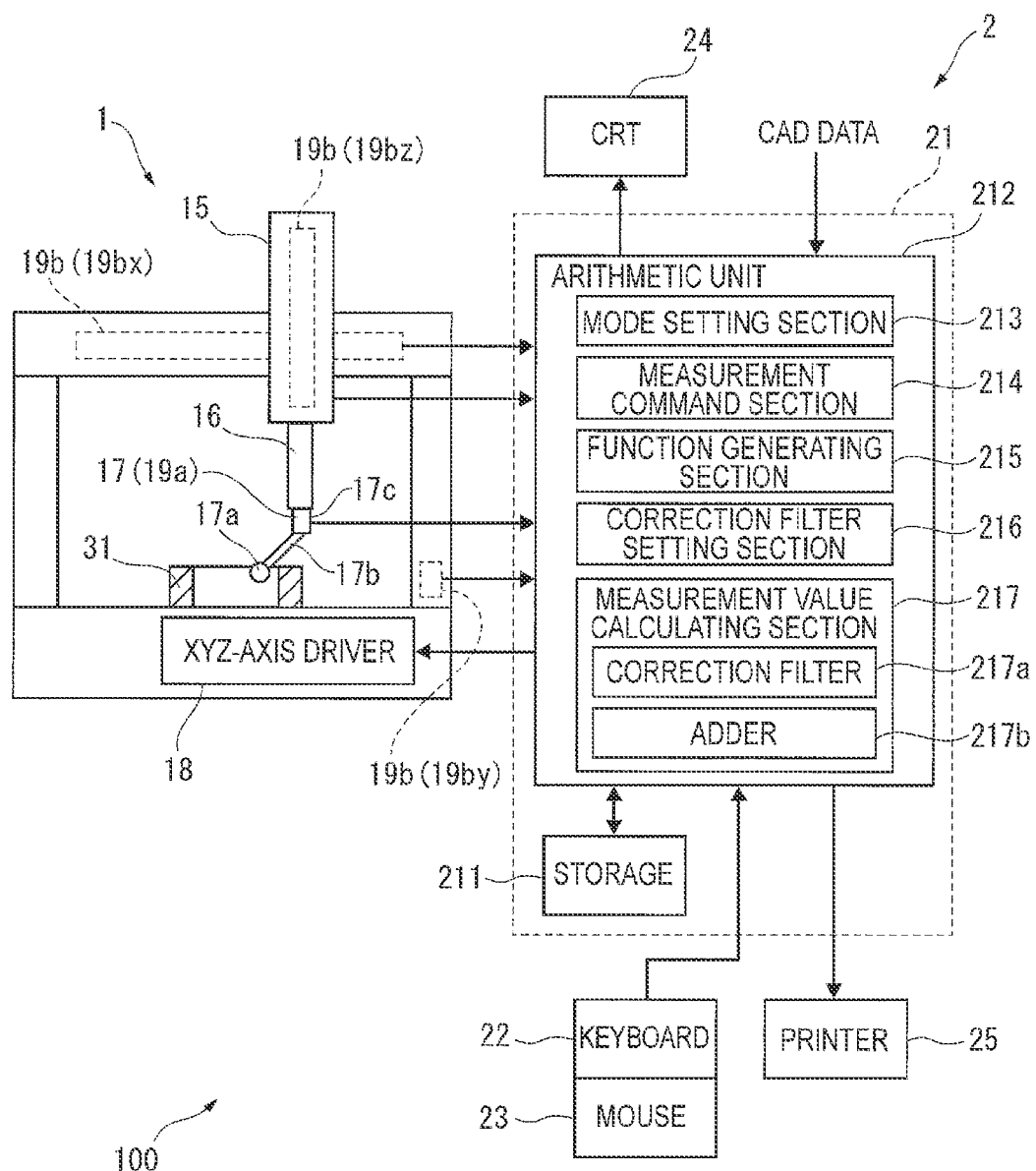
FIG. 2 is a block diagram schematically showing an arrangement of the form measuring machine of the exemplary embodiment.

FIG. 1 is a perspective view schematically showing a form measuring machine 100 according to the exemplary embodiment of the invention. FIG. 2 is a block diagram schematically showing an arrangement of the form measuring machine 100.

As shown in FIG. 1, the form measuring machine 100 includes a coordinate measuring machine 1 and a computer 2. The coordinate measuring machine 1 and the computer 2 are connected to each other through, for instance, a cable 3. It should be noted that the coordinate measuring machine 1 and the computer 2 may be connected to each other with another device such as a motion controller provided therebetween, or may be communicably connected to each other through, for instance, a wireless communication network in place of the cable 3.

Arrangement of Coordinate Measuring Machine

For instance, the coordinate measuring machine 1 is configured as shown in FIG. 1. Specifically, the coordinate measuring machine 1 includes a vibration isolation table 10 and a surface plate 11 provided on the vibration isolation table 10 with an upper surface (base surface) thereof corresponding to a horizontal plane (XY-plane in FIG. 1). A Y-axis driving mechanism 14 extending in a Y-axis direction is provided on an end of the surface plate 11 in an X-axis direction. A beam support 12a is vertically provided on the Y-axis driving mechanism 14. The Y-axis driving mechanism 14 thus drives the beam support 12a in the Y-axis direction. A beam support 12b is vertically provided on an opposite end of the surface plate 11 in the X-axis direction. The beam support 12b has a lower end that is supported by an air bearing to be movable in the Y-axis direction. A beam 13 extending in the X-axis direction has opposite ends individually supported by the beam supports 12a and 12b, and supports a column 15 extending in a vertical direction (Z-axis direction). The beam 13 is provided with an X-axis driving mechanism (not shown) that drives the column 15 in the X-axis direction. The column 15 is provided with a slider 16 movable in the Z-axis direction along the column 15, and a Z-axis driving mechanism (not shown) that drives the slider 16 in the Z-axis direction. The slider 16 has a lower end attached with a scanning probe 17.

The scanning probe 17 includes a probe body 17c attached to the slider 16 and a stylus 17b removably attached to the probe body 17c. The stylus 17b has a tip end provided with, for instance, a spherical tip ball 17a.

The tip ball 17a is brought into contact with an object 31 set on the surface plate 11, and pressed against the object 31 from a reference position (neutral position) by a predetermined pressing amount. The scanning probe 17 (probe body 17c) includes a tip ball displacement detector 19a. The tip ball displacement detector 19a detects the pressing amount defined in each of the X-, Y- and Z-axis directions, i.e., a displacement of the tip ball 17a defined as X-, Y- and Z-coordinate values (a displacement from the reference position), and outputs the detected pressing amount to the computer 2.

As shown in FIG. 2, the coordinate measuring machine 1 also includes an XYZ-axis driver 18 and a scale 19b. The XYZ-axis driver 18 drives the scanning probe 17 in the X-, Y- and Z-axis directions. As the scanning probe 17 is moved in the X-, Y- and Z-axis directions, the scale 19b outputs a motion pulse of each direction of the slider 16 (i.e., a displacement of the slider 16).

The scale 19b includes an X-axis scale 19bx, a Y-axis scale 19by and a Z-axis scale 19bz. The X-axis scale 19bx is provided to the beam 13 to detect an X-axial displacement of the column 15. The Y-axis scale 19by is provided near the Y-axis driving mechanism 14 to detect a Y-axial displacement of the beam support 12a. The Z-axis scale 19bz is provided to the column 15 to detect a Z-axial displacement of the slider 16. The detected displacement information of the slider 16 (a slider displacement in each of the X-, Y- and Z-axis directions outputted from the scale 19b) is outputted to the computer 2 along with the X-, Y- and Z-coordinate values detected by the tip ball displacement detector 19a. It should be noted that the scale 19b is adjusted to output the reference position of the tip ball 17a determined when there is no relative displacement between the scale 19b and the tip ball 17a.

Arrangement of Computer

The computer 2 controls the driving of the coordinate measuring machine 1 to acquire necessary measurement values, and performs calculations required to calculate a surface texture of the object 31. As shown in FIG. 2, the computer 2 includes a computer body 21, a keyboard 22, a mouse 23, a CRT 24 and a printer 25. The keyboard 22, the mouse 23, the CRT 24 and the printer 25 may be typical devices, and thus detailed description thereof is omitted.

The computer body 21 mainly includes, for instance, a storage 211 (e.g., HDD and semiconductor memory) and an arithmetic unit 212 (e.g., CPU).

The storage 211 stores, for instance, a surface texture measuring program for driving the coordinate measuring machine 1, detection values detected by the measurement, and designed values of the object 31.

The arithmetic unit 212 reads and executes the program stored in the storage 211 to control the driving of the coordinate measuring machine 1.

Specifically, as shown in FIG. 2, the arithmetic unit 212 includes a mode setting section 213, a measurement command section 214, a function generating section 215, a correction filter setting section 216 and a measurement value calculating section 217.

The mode setting section 213 switches a function setting mode for generating a factor calculation function for calculating a correction factor, a calibration mode for calibrating the scanning probe 17, and a main measurement mode for measuring an object to be measured.

The measurement command section 214 controls the coordinate measuring machine 1 to perform measurement corresponding to each mode.

The function generating section 215 sets the factor calculation function for calculating a correction factor based on the tip ball displacement and the slider displacement in the function setting mode.

The correction filter setting section 216 calculates the correction factor based on the tip ball displacement and the slider displacement in the calibration mode and the factor calculation function, and sets a correction filter.

The measurement value calculating section 217 calculates a measurement value based on the slider displacement detected by the scale 19b and the tip ball displacement detected by the tip ball displacement detector 19a in the main measurement mode. Specifically, the measurement value calculating section 217 includes a correction filter 217a and an adder 217b. The correction filter 217a and the adder 217b will be described later in detail.

The arithmetic unit 212 receives operator's instruction information inputted using the keyboard 22 and the mouse 23 through an interface (I/F). The arithmetic unit 212 also acquires detected tip ball displacement information and slider displacement information. Based on the above information, the operator's instruction information, and the program stored in the storage 211, the arithmetic unit 212 performs various processes for, for instance, controlling the XYZ-axis driver 18 to move the slider 16, analyzing the measurement value of the object 31, and correcting the measurement value.

The arithmetic unit 212 also outputs the measurement value calculated through the various processes to the printer 25 through the interface (I/F) in accordance with the operator's instruction information inputted using the keyboard 22 and the mouse 23. The arithmetic unit 212 also controls the CRT 24 to output and display the measurement result and the like.

The arithmetic unit 212 also acquires CAD data of the object 31 from, for instance, an external CAD system (not shown).

Form Measuring Method for Form Measuring Machine

Next, a form measuring method for the form measuring machine 100 will be described with reference to the attached drawings.

Figure 3:
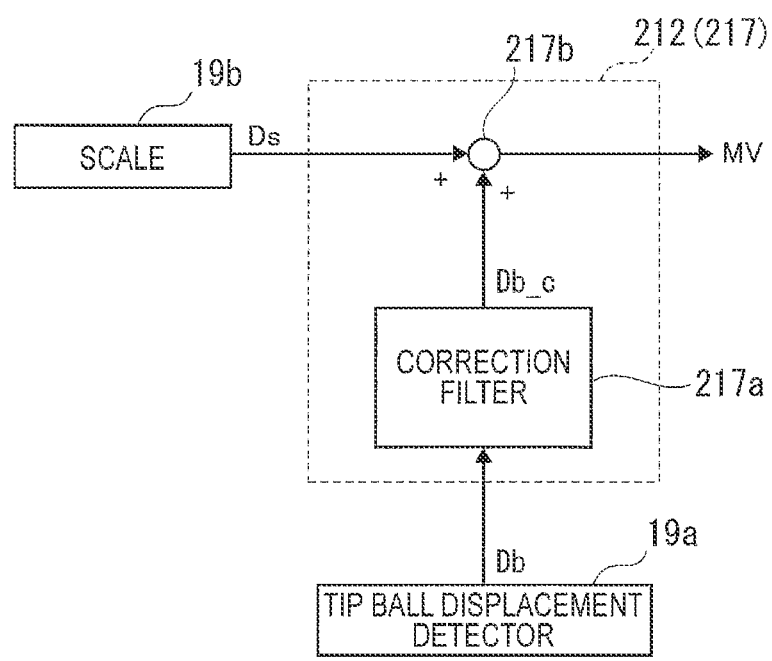
FIG. 3 is a control block diagram showing a measurement value calculating section and peripheral devices thereof according to the exemplary embodiment.

FIG. 3 is a control block diagram showing the measurement value calculating section 217 of the arithmetic unit 212 and peripheral devices thereof.

As shown in FIG. 3, the measurement value calculating section 217 includes the correction filter 217a and the adder 217b. In the main measurement mode, while a slider displacement Ds detected by the scale 19b is directly inputted to the adder 217b of the measurement value calculating section 217, a tip ball displacement Db detected by the tip ball displacement detector 19a is inputted to the correction filter 217a to correct an error in the tip ball 17a caused in a measurement space, and then inputted to the adder 217b as a corrected tip ball displacement Db_c. The adder 217b adds up the slider displacement Ds and the corrected tip ball displacement Db_c as a measurement value MV, and outputs it.

The correction filter 217a uses an estimated value G1(s) as a correction value to be applied to the tip ball displacement Db, the estimated value G1(s) being approximated to inverse characteristics of frequency transfer from the scale 19b to the tip ball 17a. The estimated value G1(s) may be represented by the following equation (1).

$$G1(s) = \frac{\omega_P^2(s^2 + 2\zeta_Z\omega_Z s + \omega_Z^2)}{\omega_Z^2(s^2 + 2\zeta_P\omega_P s + \omega_P^2)} \quad (1)$$

In the equation (1), $\omega_Z$ is a zero-point angular frequency, $\omega_P$ is a pole angular frequency, $\zeta_Z$ is a zero-point damping factor, $\zeta_P$ is a pole damping factor, and s is the Laplace operator. The "zero point" means a value of s determined when the estimated value G1(s) is zero, and the "pole" is a value of s determined when the estimated value G1(s) is infinity.

In the exemplary embodiment, the correction filter setting section 216 sets the zero-point angular frequency $\omega_Z$ and the zero-point damping factor $\zeta_Z$ in the expression (1). The pole angular frequency $\omega_P$ is a value obtained by multiplying the zero-point angular frequency $\omega_Z$ by a constant ($\omega_P = K \cdot \omega_Z$, in which K is the constant), and the pole damping factor $\zeta_P$ is a fixed value. Calculation methods of the zero-point angular frequency $\omega_Z$ and the zero-point damping factor $\zeta_Z$ will be specifically described below.

Calculation of Factor Calculation Function

In the form measuring machine 100 of the exemplary embodiment, the function generating section 215 first calculates the factor calculation function in order to set the correction factor (zero-point angular frequency $\omega_Z$ and zero-point damping factor $\zeta_Z$).

Figure 4:
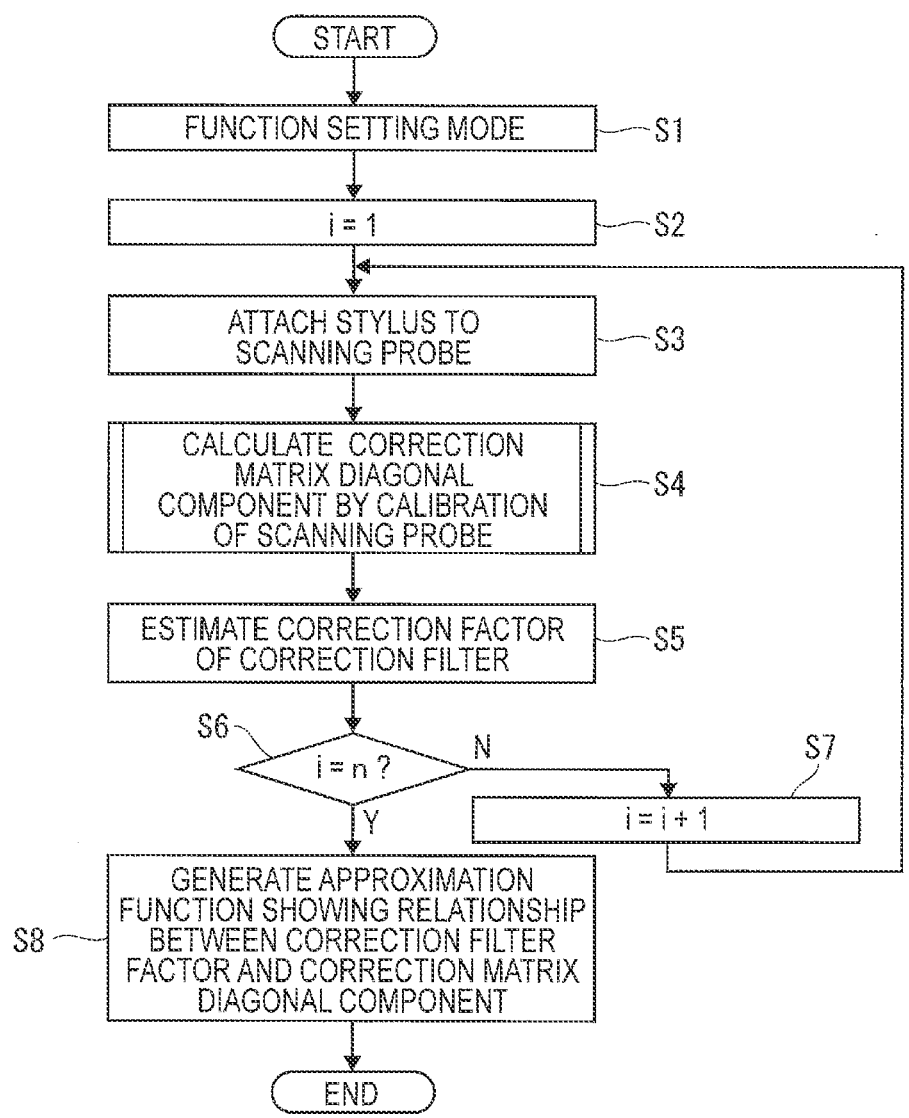
FIG. 4 is a flow chart showing a process for deriving a factor calculation function according to the exemplary embodiment.

FIG. 4 is a flow chart showing a process for deriving the factor calculation function according to the form measuring method for the form measuring machine 100.

In order to derive the factor calculation function, the mode setting section 213 of the arithmetic unit 212 sets an operation mode of the form measuring machine 100 at the function setting mode (step S1).

In the function setting mode, the function generating section 215 initializes a variable i representing a type of the stylus of the scanning probe 17 (i=1) (step S2). It should be noted that, in the function setting mode, plural (n) types of styli 17b, which are different in, for instance, length, diameter, material and/or tip-ball size, are attached in turn to the probe body 17c of the scanning probe 17, and the factor calculation function is calculated from individual values of the tip ball displacement and individual values of the slider displacement obtained using the styli 17b.

The variable i is thus an integer satisfying 1≤i≤n.

After step S2, one of the styli 17b corresponding to the variable i is attached to the probe body 17c (step S3).

The function generating section 215 then calibrates the scanning probe 17 to calculate a correction matrix diagonal component for the scanning probe 17 (step S4).

For measurement of the measurement value using the form measuring machine 100, when the slider displacement Ds detected by the scale 19b is defined as the X-, Y- and Z-axial displacements ($x_s$, $y_s$, $z_s$), and the tip ball displacement Db detected by the tip ball displacement detector 19a is defined as the X-, Y- and Z-axial displacements ($x_b$, $y_b$, $z_b$), the measurement value is usually calculated by respectively adding up the axial-displacements ($x_s$, $y_s$, $z_s$) and the axial-displacements ($x_b$, $y_b$, $z_b$) as shown in the following expression (2).

$$\begin{Bmatrix} x \\ y \\ z \end{Bmatrix} = \begin{Bmatrix} x_s \\ y_s \\ z_s \end{Bmatrix} + \begin{Bmatrix} x_b \\ y_b \\ z_b \end{Bmatrix} \quad (2)$$

However, when a coordinate system for the scale 19b of the coordinate measuring machine 1 (a machine coordinate system) and a coordinate system for the tip ball displacement detector 19a (a probe coordinate system) fail to coincide with each other, an error is inevitable. The error due to the difference between the coordinate systems can be reduced by coordinate transformation of the values (xb, yb, zb) of the probe coordinate system using a correction matrix represented by the following equation (3) (i.e., by associating the tip ball displacement detected by the tip ball displacement detector 19a with the coordinate system for the scale 19b).

$$\begin{Bmatrix} x_{b\_m} \\ y_{b\_m} \\ z_{b\_m} \end{Bmatrix} = \begin{bmatrix} A_{11} & A_{12} & A_{13} \\ A_{21} & A_{22} & A_{23} \\ A_{31} & A_{32} & A_{33} \end{bmatrix} \begin{Bmatrix} x_b \\ y_b \\ z_b \end{Bmatrix} \quad (3)$$

$$\begin{bmatrix} A_{11} & A_{12} & A_{13} \\ A_{21} & A_{22} & A_{23} \\ A_{31} & A_{32} & A_{33} \end{bmatrix} : \text{Correction Matrix}$$

An example of a calculation method of a correction matrix diagonal component is described with reference to FIGS. 5 and 6.

Figure 5:
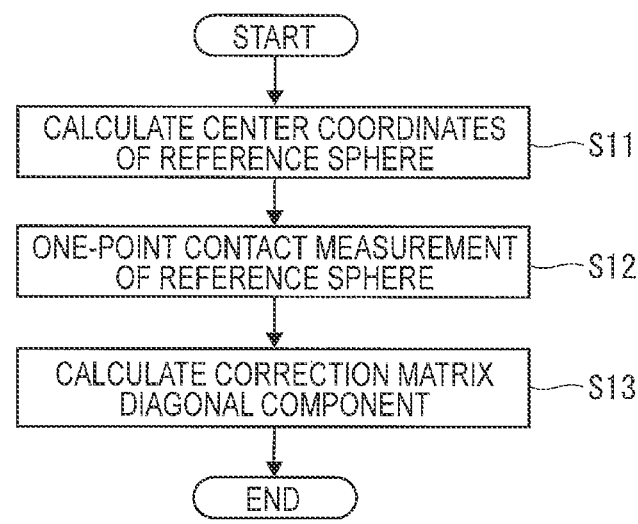
FIG. 5 is a flow chart showing a calculation method of a correction matrix diagonal component according to the exemplary embodiment.

FIG. 5 is a flow chart showing a calculation method of the correction matrix diagonal component in step S4. FIG. 6 shows the implementation of a one-point contact measurement.

In step S4 of the exemplary embodiment, the measurement command section 214 performs touch measurement, in which, for instance, the tip ball 17a is brought into slight contact with a reference sphere 60 set on the surface plate 11 as shown in FIG. 1. Center coordinates of the reference sphere 60 are thus determined (step S11).

Next, the measurement command section 214 performs measurement in which the tip ball 17a is in contact with the reference sphere 60 at one point (hereinafter, referred to as "one-point contact measurement") in each of the X-, Y- and Z-axis directions (step S12).

The one-point contact measurement performed in the X-axis will be described as a representative example of step S12.

In step S12, the scanning probe 17 is immobilized in the Y- and Z-axis directions to prevent a displacement of the tip ball 17a in these two directions. It should be noted that a known technique disclosed in, for instance, Japanese Patent No. 2628523 is applicable to accept a displacement in one axial direction but restrict a displacement in the other two axial directions.

Next, as shown in FIG. 6, the tip ball 17a of the scanning probe 17 is brought into one-point contact with the surface of the reference sphere 60 in a normal direction relative to the reference sphere 60. In this case, the tip ball 17a is moved in a manner to approach the reference sphere 60 from a position near the reference sphere 60. Even after brought into contact with the reference sphere 60, the tip ball 17a is further moved. When the detection value outputted from the tip ball displacement detector 19a reaches a first predetermined value, the detection values (the tip ball displacement and the slider displacement) outputted from the tip ball displacement detector 19a and the scale 19b start to be acquired.

When the detection value from the tip ball displacement detector 19a reaches a second predetermined value, the motion of the tip ball 17a is inverted. The tip ball 17a is then moved in the normal direction until separated from the reference sphere 60. Similarly, the detection values outputted from the tip ball displacement detector 19a and the scale 19b are continuously acquired during the inverted motion. In other words, the detection values outputted from the tip ball displacement detector 19a and the scale 19b are continuously acquired until the tip ball 17a is separated from the reference sphere 60 after brought into contact with the reference sphere 60.

The measurement command section 214 also performs the above one-point contact measurement for each of the Y- and Z-axes.

Subsequently, the function generating section 215 calculates correction matrix diagonal components $A_{11}$, $A_{22}$ and $A_{33}$ based on the detection values (tip ball displacement) outputted from the tip ball displacement detector 19a and the detection values (slider displacement) outputted from the scale 19b (step S13).

In step S12, the scanning probe 17 is moved in one direction, while being immobilized in the other two directions to prevent the tip ball 17a from being displaced in the other directions. Consequently, the detection values detected by the scale 19b and the tip ball displacement detector 19a in the two directions where the displacement of the tip ball 17a is restricted are "zero." As for a displacement of the tip ball 17a in the one direction where the motion of the tip ball 17a is permitted, since the tip ball 17a is in contact with the reference sphere 60 at one point, the detection values from the scale 19b of the coordinate measuring machine 1 are supposed to be equal in absolute value and opposite in sign to the detection values of the tip ball displacement detector 19a subjected to the coordinate transformation using the correction matrix. In other words, for instance, the detection values of the coordinate measuring machine and the detection values of the probe detected in the X-axis direction satisfy the following equation (4). It should be noted that the same applies to the detection values detected in the Y- and Z-axis directions.

$$\{x_{s1} x_{s2} \ldots x_{s1}\} - \{x_{s1} x_{s1} \ldots x_{s1}\} = -A_{11}\{x_{b1} x_{b2} \ldots x_{b1}\} \quad (4)$$

$\{x_{s1}\ x_{s2}\ \ldots\ x_{s1}\}$: Detection Values from Scale
$\{z_{b1}\ x_{b2}\ \ldots\ x_{b1}\}$: Detection Values from Tip Ball Displacement Detector In step S13, the function generating section 215 applies, for instance, a method of least squares to the equation (4) to perform linear approximation. The correction matrix diagonal component $A_{11}$ can thus be easily calculated. The diagonal components $A_{22}$ and $A_{33}$ can also be calculated based on the detection values of the one-point contact measurement performed in the Y- and Z-axis directions in the same manner as described above.

Referring back to FIG. 4, after step S4, the function generating section 215 estimates the correction factor of the correction filter 217a for the scanning probe 17 (step S5).

In step S5, the function generating section 215 calculates the correction factor by, for instance, a method disclosed in JP-A-2007-315897.

Specifically, a workpiece (reference piece) where XY-plane, YZ-plane and ZX-plane are defined, such as a gauge block, is set on the surface plate 11 with the edge between the XY-plane and the ZX-plane, the edge between the YZ-plane and the XY-plane, and the edge between the ZX-plane and the YZ-plane corresponding to the X-, Y- and Z-axis directions of the coordinate measuring machine 1.

The measurement command section 214 outputs a command to the XYZ-axis driver 18 so that the slider 16 is moved in the Y-axis direction by the Y-axis driving mechanism 14 and the tip ball 17a of the scanning probe 17 is brought into contact with the workpiece and pressed against the XZ-plane of the workpiece by the predetermined pressing amount (i.e., so that the tip ball 17a is displaced in the Y-axis direction by a predetermined amount). Subsequently, the measurement command section 214 gives a command to the Y-axis driving mechanism 14 so that the slider 16 of the coordinate measuring machine 1 is reciprocated in the Y-axis direction for a predetermined time. During the reciprocation, the amplitude and phase of the tip ball displacement in each of the axial directions outputted from the scale 19b and the amplitude and phase of the slider displacement in each of the axial directions outputted from the tip ball displacement detector 19a are recorded. It is usually preferable that the slider 16 is reciprocated with a sinusoidal change in speed.

Subsequently, the slider 16 is reciprocated for a different time (i.e., at a different period of reciprocation or frequency of reciprocation), and the resulting amplitude and phase of the slider displacement and the resulting amplitude and phase of the tip ball displacement are recorded.

Based on information of the thus-obtained amplitudes and phases at the different periods (frequencies), an estimated value of the characteristics of frequency transfer (frequency transfer function) from the Y-axis scale 19by to the tip ball 17a is determined. The estimated value is then inverted to obtain the correction factor of the estimated value G1(s).

It should be noted that the above process is performed for each of the X- and Z-axes. Specifically, the measurement command section 214 similarly outputs a command to the XYZ-axis driver 18 to drive each of the X-axis driving mechanism and the Z-axis driving mechanism to obtain a transfer function for each of the X- and Z-axes.

Since the characteristics of frequency transfer from the Y-axis scale 19by to the tip ball 17a, the characteristics of frequency transfer from the X-axis scale 19bx to the tip ball 17a, and the characteristics of frequency transfer from the Z-axis scale 19bz to the tip ball 17a are not necessarily the same, the resulting transfer functions are usually different.

Further, the transfer functions may be different depending on, for instance, the respective positions of the beam supports 12a, 12b of the coordinate measuring machine 1 (e.g., depending on whether the beam supports 12a, 12b are positioned at the near side, the middle or the far side in a depth direction in FIG. 1).

In this case, the accuracy of the correction filter 217a can be enhanced by obtaining a transfer function at each of predetermined positions of the slider 16 in each of X-, Y- and Z-axis directions in advance, and applying one of the thus-obtained transfer functions corresponding to the positions of the slider 16 in the X-, Y- or Z-axis directions.

Further, the above calculation method of the correction filter 217a is based on the premise that the tip ball displacement detector 19a provides an output containing only a Y-axial component in response to the command for reciprocation given to the Y-axis driving mechanism 14, and the other X- and Z-axis components are not changed. However, the X- and Z-axis components may be actually changed in response to the command for reciprocation only in the Y-axis direction. Specifically, when the beam supports 12a, 12b are vibrated in the Y-axis direction (i.e., in a near/far direction in FIG. 1), the tip ball 17a of the scanning probe 17 may be vibrated in the X- or Z-axis direction. In case of such a vibration in an unintended direction, the transfer function based on the relevant component is obtained in advance so that a displacement of the tip ball 17a can be further accurately estimated using the correction filter 217. It should be noted that in order to obtain the component relevant to the unintended vibration, for instance, the tip ball 17a of the scanning probe 17 is preferably immobilized in the X- and Z-axis directions while being in contact with the workpiece in the Y-axis direction and pressed thereagainst by the predetermined amount. For instance, a swivel joint that is not displaceable but rotatable around the X-, Y- and Z-axes may be used to immobilize the tip ball 17a to the surface plate 11.

After step S5, the function generating section 215 determines whether or not the variable i is equal to n (step S6). When the determination result is "No" in step S6, one is added to the variable i (step S7: i=i+1). Subsequently, the process returns to step S3, and another stylus 17b of a different type is attached to the probe body 17c.

When the determination result is "Yes" in step S6, the function generating section 215 generates a function representing a relationship between the correction matrix diagonal component calculated in step S4 and the correction factor of the filter calculated in step S5 (step S8).

FIGS. 7 and 8 show a function representing a relationship between a correction factor in the X-axis direction and the correction matrix diagonal component $A_{11}$. It should be noted that the n-types of styli 17b for determining the factor calculation function are attached in turn to the probe body 17c to define a plurality of scanning probes 17, and open circles in FIGS. 7 and 8 correspond to each of the scanning probes 17.

As shown in FIG. 7, an approximation function showing a relationship of a correction factor $\omega_Z$ (the zero-point angular frequency) with the diagonal component $A_{11}$ is derived based on individual values of the correction matrix diagonal component $A_{11}$ and individual values of the zero-point angular frequency $\omega_Z$ in the X-axis direction calculated for the scanning probes 17 defined by attaching the plural types of styli 17b in turn to the probe body 17c.

Specifically, the function generating section 215 derives the approximation function of the correction factor $\omega_Z$ corresponding to the diagonal component $A_{11}$ represented by the following equation (5).

$$\omega_z = \sqrt{k_{\omega Z 1} + \frac{k_{\omega Z 1} \times k_{\omega Z 2}}{A_{11} - k_{\omega Z 2}}} \tag{5}$$

$(k_{\omega Z 1}, k_{\omega Z 2}$: Constant)

Similarly, as shown in FIG. 8, the function generating section 215 derives an approximation function showing a relationship of a correction factor $\zeta_Z$ (the zero-point damping factor) with the diagonal component $A_{11}$ based on individual values of the correction matrix diagonal component $A_{11}$ and individual values of the zero-point damping factor $\zeta_Z$ in the X-axis direction calculated for the scanning probes 17 defined by attaching the plural types of styli 17b in turn to the probe body 17c.

Specifically, the function generating section 215 derives the approximation function of the correction factor $\zeta_Z$ corresponding to the diagonal component $A_{11}$ represented by the following equation (6).

$$\zeta_Z = k_{\zeta Z 1} \cdot A_{11}{}^2 + k_{\zeta Z 2} \cdot A_{11} + k_{\zeta Z 3} \tag{6}$$

$(k_{\zeta Z 1}, k_{\zeta Z 2}, k_{\zeta Z 3}$: Constant)

It should be noted that FIGS. 7 and 8 and the equations (5) and (6) show the X-axial correction factor, and a factor calculation function for each of the Y- and Z-axis directions is derived in the same manner. The factor calculation function for the Y-axis direction is derived based on the correction matrix diagonal component $A_{22}$ and correction factors estimated in the Y-axis direction (i.e., the zero-point angular frequency and the zero-point damping factor). The factor calculation function for the Z-axis direction is derived based on the correction matrix diagonal component $A_{33}$ and correction factors estimated in the Z-axis direction (i.e., the zero-point angular frequency and the zero-point damping factor).

Setting of Correction Filter

Next, a correction filter setting process for the form measuring machine 100 will be described with reference to the attached drawings.

FIG. 9 is a flow chart showing a correction filter setting process according to the form measuring method for the form measuring machine 100.

In form measurement using the form measuring machine 100, the mode setting section 213 first sets the operation mode of the form measuring machine 100 at the calibration mode (step S21).

In the calibration mode, the correction filter setting section 216 calibrates the scanning probe 17 to calculate the correction matrix diagonal component for the scanning probe 17 (step S22). Specifically, in step S22, which is the same as step S4, the processes in steps S11 to S13 shown in FIG. 5 are performed to calculate the correction matrix diagonal component for the scanning probe 17.

Subsequently, based on the factor calculation function generated in step S8, the correction filter setting section 216 calculates the correction factors (i.e., the zero-point angular frequency $\omega_Z$ and the zero-point damping factor $\zeta_Z$) corresponding to the correction matrix diagonal component ($A_{11}$, $A_{22}$, $A_{33}$), which is calculated in step S22, in each of the X-, Y- and Z-axis directions (step S23). It should be noted that the pole angular frequency $\omega_p$ the pole damping factor $\zeta_p$, which are factors for reducing a high-frequency noise component in the detection value amplified by the correction filter 217a, may each be calculated by a simple equation or may each be a constant. In the exemplary embodiment, the pole angular frequency $\omega_P$ is a value obtained by multiplying the zero-point angular frequency $\omega_Z$ by a constant, and the pole damping factor $\zeta_P$ is a predetermined fixed value (constant) as described above.

The correction filter setting section 216 substitutes the correction factors $\omega_Z$ and $\zeta_Z$ calculated in step S23 in the equation (1) to set the estimated value (correction value) G1(s) for the correction filter (step S24).

In the exemplary embodiment, even when another stylus different from the plural (n) types of styli 17b used in step S4 is attached to the probe body 17c, the correction filter can be set based on an appropriate correction factor obtained with reference to the factor calculation function. FIG. 10 shows a measurement result of a ring gauge measured using the correction value G1(s) for the correction filter calculated according to the exemplary embodiment, the correction value G1(s) being obtained using another stylus 17b different from the styli 17b for deriving the factor calculation function. In contrast, FIG. 11 shows a measurement result of a ring gauge measured using a typical correction filter after the stylus 17b is replaced with another one (i.e., when the correction factor is unsuitable for the newly attached stylus).

Since the typical correction filter is unsuitable for the newly attached stylus 17b, a measurement error due to a quadrant projection cannot be sufficiently reduced as shown in FIG. 11. In contrast, according to the exemplary embodiment, measurement is performed using a correction filter with a correction factor that is derived with reference to the factor calculation function to be suitable for the newly attached stylus 17b, thereby obtaining a highly accurate measurement result with a reduced measurement error due to a quadrant projection as shown in FIG. 10.

Advantage(s) of Exemplary Embodiment(s)

The form measuring machine 100 of the exemplary embodiment performs calibration of the scanning probe 17 upon replacement of the stylus 17b. Based on the slider displacement Ds detected by the scale 19b and the tip ball displacement Db detected by the tip ball displacement detector 19a during the calibration, the correction filter setting section 216 calculates the correction matrix diagonal component, calculates the correction factor for correcting a measurement error due to a quadrant projection based on the calculated correction matrix diagonal component, and sets the correction filter using the calculated correction factor.

Thus, even when the stylus 17b of the scanning probe 17 is replaced, the correction filter can be easily set without the necessity for an operator to input a correction factor conforming with conditions of the newly attached stylus 17b (e.g., a length). Further, since the correction value for the correction filter suitable for the stylus 17b is set, highly accurate form measurement can be performed with a reduced measurement error due to a quadrant projection as is evident from the comparison between FIGS. 10 and 11.

In the exemplary embodiment, the correction filter setting section 216 calculates a correction factor of the correction filter (i.e., a correction factor suitable for the scanning probe 17 used for measurement) based on the factor calculation function showing the relationship between individual values of the correction matrix diagonal component for the scanning probes 17 defined by attaching the plural types of styli 17b in turn to the probe body 17c and corresponding individual values of the correction factor for the scanning probes 17.

A suitable correction factor can thus be easily calculated from the correction matrix diagonal component, which is obtained by calibrating the scanning probe 17 attached with the stylus 17b, with reference to the factor calculation function irrespective of the type of the stylus 17b attached to the probe body 17c. Consequently, highly accurate form measurement can be performed irrespective of the type of the stylus 17b and, further, the processing speed can be increased as a result of a reduced processing load for setting the correction filter.

In the exemplary embodiment, the function generating section 215 calculates the factor calculation function showing the relationship between individual values of the correction matrix diagonal component for the scanning probes 17 defined by attaching the plural types of styli 17b in turn to the probe body 17c and corresponding individual values of the correction factor of the correction filter for the scanning probes 17.

The factor calculation function is supposed to be stored in the storage 211 in advance, for instance, at the shipping from a factory, but a value of the correction factor relative to the correction matrix diagonal component may be changed due to a change in a measurement environment and a change in the frequency transfer function resulting from a change in the coordinate measuring machine 1 with time. However, in the exemplary embodiment, the function generating section 215 calculates the factor calculation function as described above. In other words, even when a change in the frequency transfer function is inevitable, a correction factor of the correction filter suitable for the scanning probe 17 can be set by updating the factor calculation function as described above, thereby suppressing a reduction in the measurement accuracy.

In the exemplary embodiment, the correction filter setting section 216 calculates the zero-point angular frequency $\omega_Z$ and the zero-point damping factor $\zeta_Z$ in the equation (1). Even when the pole angular frequency $\omega_p$ and the pole damping factor $\zeta_p$, which are factors for reducing a noise component amplified by the correction filter, are each calculated by a simple equation or provided by a constant, a sufficient measurement accuracy can be maintained. Accordingly, the pole angular frequency $\omega_p$ and the pole damping factor $\zeta_p$ can be each calculated by a simple equation or provided by a constant while the correction factors $\omega_Z$ and $\zeta_Z$ are calculated, so that the processing speed can be increased as compared with the case where, for instance, all the correction factors are calculated from the correction matrix diagonal component.

Modification(s)

Incidentally, it should be understood that the scope of the invention is not limited to the above-described exemplary embodiment(s) but includes modifications and improvements compatible with the invention.

For instance, in the exemplary embodiment, the correction filter based on the inverse characteristics of frequency transfer from the scale 19b to the tip ball 17a is used to correct the tip ball displacement outputted from the tip ball displacement detector 19a, but it is not requisite. For instance, the correction filter based on the characteristics of frequency transfer from the scale 19b to the tip ball 17a may be used to correct the slider displacement outputted from the scale 19b, and the corrected slider displacement and the tip ball displacement may be added up to obtain the measurement value. In this case, the scanning probes 17 defined by attaching the plural types of styli 17b in turn to the probe body 17c may be calibrated, and the factor calculation function may be derived from individual values of the correction matrix diagonal component for the scanning probes 17 and individual estimated values of the correction factor for the scanning probes 17, as in the exemplary embodiment. Further, when the scanning probes 17 are calibrated in the above manner, it is possible to obtain the correction matrix diagonal component for the scanning probe 17 in use suitable for the characteristics of the stylus 17b attached to the probe body 17c and the probe body 17c, and set the correction filter using the correction factor corresponding to the correction matrix diagonal component calculated with reference to the factor calculation function.

Although the function generating section 215 generates the factor calculation function in the exemplary embodiment, the function generating section 215 may be omitted. In this case, for instance, the factor calculation function may be calculated and stored in the storage 211 in advance at the shipping of the coordinate measuring machine 1 from a factory.

Further, although the function generating section 215 generates the factor calculation function in the exemplary embodiment, for instance, a look-up data table where individual values of the correction matrix diagonal component for the scanning probes 17 defined by attaching the plural types of styli 17b in turn to the probe body 17c are associated with corresponding individual values of the correction factor for the scanning probes 17 may be generated and stored in the storage 211. When the function generating section 215 is omitted as in the above case, the look-up data table may be stored in the storage 211 in advance at the shipping from a factory. When the correction factor is calculated with reference to the look-up table, but the correction matrix diagonal component for the scanning probe 17 in use is not present on the table, the correction filter setting section 216 may estimate the required correction factor by, for instance, interpolation.

In the exemplary embodiment, for instance, the correction filter setting section 216 calculates the zero-point angular frequency $\omega_Z$ and the zero-point damping factor $\zeta_Z$ as the correction factors, but it is not requisite. As long as at least the zero-point angular frequency $\omega_Z$ is calculated as the correction factor, the correction filter can sufficiently reduce a measurement error due to a quadrant projection as compared with a typical correction filter. Alternatively, factor calculation functions regarding three or more factors may be used to calculate the three or more factors as the correction factors. For instance, factor calculation functions regarding the zero-point angular frequency $\omega_Z$, the zero-point damping factor $\zeta_Z$, the pole angular frequency $\omega_P$ and the pole damping factor $\zeta_P$ may be used to calculate these four correction factors. In this case, the accuracy of form measurement can be further enhanced.

In the exemplary embodiment, the function generating section 215 obtains individual values of the correction matrix for the scanning probes 17 defined by attaching the plural types of styli 17b in turn to the probe body 17c and corresponding individual values of the correction factor, and calculates the factor calculation function from these values. However, the factor calculation function may be calculated from individual values of the correction matrix and corresponding individual values of the correction factor for the scanning probes 17 defined by additionally replacing probe bodies 17c with one another. In the form measuring machine 100, the probe bodies 17c replaceable with one another are usually designed to have the same specification. However, an individual variability is likely to be provided to even the probe bodies 17c having the same specification during a manufacturing process. However, as long as the factor calculation function is determined by replacing the probe bodies 17c with one another as described above, an influence of such an individual variability can be reduced. In case of replacing the probe body 17c with one with different frequency transfer characteristics, the factor calculation function may be calculated from individual values of the correction matrix and corresponding individual values of the correction factor for the scanning probes 17 defined by replacing plural types of probe bodies 17c with one another.

Any other specific arrangement and the like may be altered as needed in implementation of the invention as long as an object of the invention is achievable.

What is claimed is:

1. A form measuring machine comprising:
    a scanning probe comprising: a stylus with a tip end provided with a tip ball that is brought into contact with an object to be measured; and a probe body attached with the stylus;
    a movable slider configured to support the scanning probe;
    a scale configured to detect a slider displacement of the slider;
    a tip ball displacement detector configured to detect a tip ball displacement of the tip ball of the scanning probe relative to a support portion where the slider supports the scanning probe; and
    an arithmetic unit configured to calculate a measurement value based on the slider displacement detected by the scale, the tip ball displacement detected by the tip ball displacement detector, and a correction filter configured to correct a measurement error, the arithmetic unit comprising a correction filter setting section configured to: calculate a correction matrix diagonal component from the slider displacement detected by the scale and the tip ball displacement detected by the tip ball displacement detector during measurement of a calibration reference piece; and calculate a correction factor of the correction filter from the correction matrix diagonal component to set the correction filter, the correction matrix associating the tip ball displacement with a coordinate system for the scale.

2. The form measuring machine according to claim 1, wherein the correction filter setting section calculates the correction factor of the correction filter using a factor calculation function or table data that shows a relationship between the correction matrix diagonal component for the scanning probe and the correction factor of the correction filter for the scanning probe.

3. The form measuring machine according to claim 2, wherein
    the stylus comprises plural types of styli attached in turn to the probe body to define a plurality of scanning probes comprising the scanning probe, the scanning probes being used in turn to measure the calibration reference piece to calculate individual values of the correction matrix diagonal component and corresponding individual values of the correction factor of the correction filter for the scanning probes, and the arithmetic unit further comprises a function generating section configured to generate the factor calculation function or the table data based on the individual values of the correction matrix diagonal component and the corresponding individual values of the correction factor of the correction filter for the scanning probes.

4. The form measuring machine according to claim 1, wherein the correction factor of the correction filter comprises a zero-point angular frequency, a pole angular frequency, a zero-point damping factor and a pole damping factor, and the correction filter setting section calculates at least the zero-point angular frequency.

5. The form measuring machine according to claim 2, wherein the correction factor of the correction filter comprises a zero-point angular frequency, a pole angular frequency, a zero-point damping factor and a pole damping factor, and the correction filter setting section calculates at least the zero-point angular frequency.

6. The form measuring machine according to claim 3, wherein the correction factor of the correction filter comprises a zero-point angular frequency, a pole angular frequency, a zero-point damping factor and a pole damping factor, and the correction filter setting section calculates at least the zero-point angular frequency.

7. A form measuring method for a form measuring machine, the form measuring machine comprising:

a scanning probe comprising: a stylus with a tip end provided with a tip ball that is brought into contact with an object to be measured; and a probe body attached with the stylus;

a movable slider configured to support the scanning probe;

a scale configured to detect a slider displacement of the slider; and a tip ball displacement detector configured to detect a tip ball displacement of the tip ball of the scanning probe relative to a support portion where the slider supports the scanning probe, the method comprising:

calculating a correction matrix diagonal component from the slider displacement detected by the scale and the tip ball displacement detected by the tip ball displacement detector during measurement of a calibration reference piece, the correction matrix associating the tip ball displacement with a coordinate system for the scale;

calculating a correction factor of the correction filter from the correction matrix diagonal component to set the correction filter; and calculating a measurement value based on the set correction filter, the slider displacement detected by the scale, and the tip ball displacement detected by the tip ball displacement detector.

* * * * *